US012798052B2

(12) United States Patent
Zhang

(10) Patent No.: US 12,798,052 B2
(45) Date of Patent: Nov. 17, 2026

(54) MULTIFUNCTIONAL PLIERS

(71) Applicants: Link-tech (Tianjin) Metal Products Co., Ltd., Tianjin (CN); APEX TOOLS CO., LTD, Chonburi (TH)

(72) Inventor: Lei Zhang, Tianjin (CN)

( * ) Notice: Subject to any disclaimer, the term of this patent is extended or adjusted under 35 U.S.C. 154(b) by 342 days.

(21) Appl. No.: 18/679,417

(22) Filed: May 30, 2024

(65) Prior Publication Data

US 2024/0316731 A1 Sep. 26, 2024

(30) Foreign Application Priority Data

May 13, 2024 (CN) ......................... 202421034162.2

(51) Int. Cl.
*B25B 7/22* (2006.01)
*B23D 29/02* (2006.01)

(52) U.S. Cl.
CPC ................ *B25B 7/22* (2013.01); *B23D 29/02* (2013.01)

(58) Field of Classification Search
CPC .... B25B 7/22; B25B 5/00; B25B 7/02; B25B 7/04; B25B 7/06; B25B 9/00; B25B 11/00; B23B 29/02; B26B 13/28; B26B 17/02; B25F 1/00; B25F 1/003; B25F 1/006; B25F 1/02; B25F 1/04
USPC ............................................ 7/132, 158, 134
See application file for complete search history.

(56) References Cited

U.S. PATENT DOCUMENTS

| | | | | |
|---|---|---|---|---|
| 699,832 | A * | 5/1902 | Broadbooks | A45D 26/0066 81/416 |
| 5,862,552 | A * | 1/1999 | Koelewyn | B25B 7/22 81/421 |
| 8,051,572 | B2 * | 11/2011 | Zhang | B25B 27/10 30/186 |
| 8,176,814 | B1 * | 5/2012 | Bernstein | B21F 1/002 81/426 |
| 2016/0016302 | A1 * | 1/2016 | Zinser | H02G 1/1236 81/9.4 |
| 2019/0232479 | A1 * | 8/2019 | Wiwatowski | B26B 1/04 |
| 2023/0053854 | A1 * | 2/2023 | Shen | B25B 7/12 |

* cited by examiner

*Primary Examiner* — Monica S Carter
*Assistant Examiner* — Daniel Lundy

(57) ABSTRACT

Multifunctional pliers, which relate to a technical field of hand tools, include: a plier head and a plier handle, wherein a cutting head is provided at two side portions of the plier head, which has two edges fitting side portions of two ends of a metal clamp, and a gap is formed between the two edges for containing the two ends of the metal clamp. The multifunctional pliers make the operation more convenient and faster by adding the metal clamp cutting function, thereby saving time and cost, improving work efficiency, and reducing maintenance cost. The multifunctional pliers provide the users with a convenient and efficient choice of tools, which is an ideal assistant for modern pipeline engineering construction and maintenance.

6 Claims, 5 Drawing Sheets

MULTIFUNCTIONAL PLIERS

CROSS REFERENCE OF RELATED APPLICATION

The present invention claims priority under 35 U.S.C. 119(a-d) to CN 202421034162.2, filed May 13, 2024.

BACKGROUND OF THE PRESENT INVENTION

Field of Invention

The present invention relates to a technical field of hand tools, and more particularly to a pair of multifunctional pliers.

Description of Related Arts

Conventional PEX pipe or aluminum-plastic composite pipe are usually connected to pipe joints using metal clamps or rings, wherein the metal clamps require special pliers for clamping and locking. This connection ensures the sealing and solidity of the pipe to a certain extent, but raises some problems. Especially, when the pipeline needs to be disassembled or there are installation errors, due to the ring or clamp has been fixed, it is difficult to be removed from the pipe fittings or pipe joints. In other words, once it is found that the pipeline needs to be disassembled, the entire connection part can rarely be reused because the ring or clamp cannot be removed. This means that even if the rest of the pipe is intact, it has to be discarded along with the entire connection part, which is not only a waste of material, but also increases the cost for maintaining and replacing the pipe. In addition, disassembling the entire connection part is always time-consuming and labor-intensive, as the ring or clamp is difficult to be removed from the fittings or joints. Meanwhile, the pipe or connection part may be damaged during disassembly, resulting in higher cost of maintenance and replacement.

Although there are special cutting pliers for plastic pipes on the market, due to their structural limitations, one tool can only cut one type of pipe clamps. In other words, one tool can only cut either the ring or the clamp, and the ring and the clamp cannot share the same tool. This limitation brings a lot of trouble to the operators and significantly affects work efficiency.

First, because one tool can only be used for one type of clamps, the operators on site need to determine the pliers to be used in advance to cut the clamp correctly, which increases the workload and the potential for error. Secondly, since different types of pipe clamps cannot share the same tool, the operators need to carry a variety of pliers, which not only increases the number and weight of tools, but also makes it more difficult to carry and manage the tools. Most importantly, this limitation will significantly reduce work efficiency. When working on site, the operator has to switch between different pliers for different pipe clamps, which not only wastes time, but also affects the continuity and efficiency of the work.

Furthermore, the pliers for locking the metal clamps have only a single-function clamping head for locking. Therefore, when the same metal clamps need to be disassembled, it is necessary to use another special disassembling tool, which also leads to the problem as mentioned above.

Therefore, in order to improve work efficiency and simplify operation, it is necessary to design a kind of clamping pliers with a metal clamp cutting function.

SUMMARY OF THE PRESENT INVENTION

In view of the defects in the prior art, an object of the present invention is to provide a pair of multifunctional pliers, which solve the problem that conventional tools for fixing or cutting of pipe-connecting metal clamps are designed with a single function, inconvenient to use, and inefficient.

Accordingly, in order to accomplish the above objects, the present invention provides: multifunctional pliers, comprising: a plier head and a plier handle, wherein a cutting head is provided at two side portions of the plier head, which has two edges fitting side portions of two ends of a metal clamp, and a gap is formed between the two edges for containing the two ends of the metal clamp.

Preferably, a strip opening of the gap is oriented to one side of the plier handle.

Preferably, the plier head is a ring locking plier head for clamping the two ends of the metal clamp, which comprises two pins symmetrically set on left and right, and a positioning shaft located in a middle of the plier head; two clamping portions are formed at a front portion of the plier head, which are configured to clamp the side portions of the two ends of the metal clamp.

Preferably, the plier head is configured to cut the metal clamp, which comprises two pins symmetrically set on left and right, and a positioning shaft located in a middle of the plier head; a clamping head and an external edge are formed at a front portion of the plier head, wherein the clamping head is configured to extend into a pipe from an end thereof, while the external edge part is configured to cut the metal clamp from outside the pipe.

Preferably, two end plates are mounted on the side portions of the plier head by the pins, and extension parts are from on a same side of the two end plates, which are on one side of the plier head; the edges are formed on internal sides of tip ends of the extension parts.

Preferably, grooves are arranged on internal surfaces of the extension parts, and the grooves of the two extension parts together form a slot at interior of the gap.

Preferably, a limiting tab is formed at a bottom portion of at least one of the grooves, which forms a limiting structure located in a bottom portion of the slot.

The multifunctional pliers of the present invention have the following advantages and effects:

1, Metal clamp cutting function: The novel pliers are designed with a metal clamp cutting structure at the front end of the plier handle, so as to cut metal clamps. This means that when the operator needs to disassemble the pipeline connection, there is no need to use other tools, since pliers can easily cut the metal clamps, which enables fast and convenient disassembling, and greatly improves the work efficiency and convenience of operation.

2, Multi-functional design: the pliers can not only be used for fixing metal clamps of pipe fittings or removing other types of clamps, but also for cutting metal clamps. Therefore, assembly and disassembly of the pipeline can be completed with one tool. It is no longer needed to carry a variety of pliers or disassembling tools, greatly simplifying the tool carrying and management of operator.

3, Time and cost saving: the design of the pliers makes it easier and more efficient to disassemble pipe connections. It not only saves the time and energy of the operator, but also reduces the difficulty of carrying and managing tools. In addition, a variety of tasks can be finished with only one tool, there is no cost for additional tools.

4, Improved work efficiency: The design of the novel pliers can quickly remove the metal clamp, and the operator does not need to switch between different types of tools and can work continuously, which improves the continuity and efficiency of the work.

In summary, the novel multifunctional pliers make the operation more convenient and faster by adding the metal clamp cutting function, thereby saving time and cost, improving work efficiency, and reducing maintenance cost. The multifunctional pliers provide the users with a convenient and efficient choice of tools, which is an ideal assistant for modern pipeline engineering construction and maintenance.

DETAILED DESCRIPTION OF THE PREFERRED EMBODIMENT

In order to make the purpose, technical solution and advantages of the present invention more clearly, the present invention will be further described below in conjunction with embodiments. It should be understood that the preferred embodiments described herein are exemplary only and are not intended to be limiting.

To solve the problem that conventional tools for fixing or cutting of pipe-connecting metal clamps are designed with a single function, inconvenient to use, and inefficient, the present invention provides a pair of multifunctional pliers, in such a manner that variety of tasks can be finished with only one tool thereby saving time and cost, improving work efficiency, and reducing maintenance cost. With the accompanying drawings, the structure of the present invention will be further described as follows.

Embodiment 1

Figure 1:
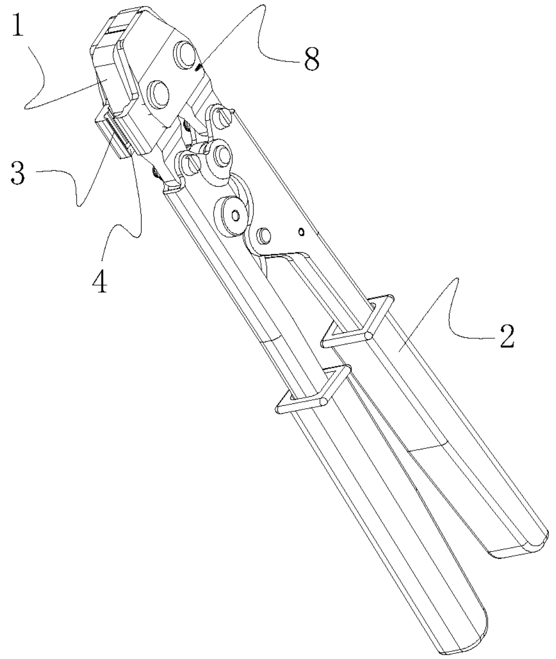
FIG. 1 is a perspective view of a pair of pliers according to an embodiment 1 of the present invention.
Figure 2:
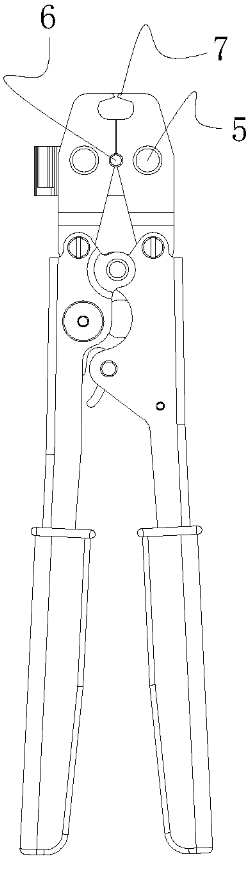
FIG. 2 is a sketch view of an internal structure of a plier head of the pliers according to the embodiment 1 of the present invention.
Figure 3:
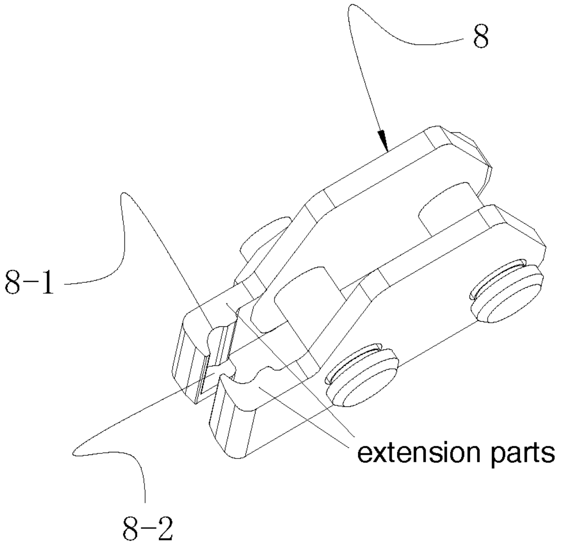
FIG. 3 is a perspective view of end plates of the pliers according to the embodiment 1 of the present invention.

Referring to FIGS. 1-3, multifunctional pliers, as known to those skilled in the art, are a common hand tool, comprising a plier head 1 and a plier handle 2. The plier head is disposed at a front end of the pliers, and usually comprises two symmetrical gripping portions for gripping, clamping, or shearing a material. Plier head varies in shapes and functions, and flat-nose pliers, round-nose pliers, and beveled-nose pliers are common ones. The flat-nose pliers are suitable for holding objects of various shapes, the round-nose pliers are used for holding, bending or rotating small parts, and the beveled-nose pliers are used for cutting metal wires or cables. The plier handle is located at a back end of the plier head, and is used to operate and control the pliers. The plier handle is usually made of metal or plastic, providing a comfortable grip and good maneuverability. The structural features of pliers make them one of the indispensable hand tools for a variety of work situations.

A cutting head is provided at two side portions of the plier head 1, which has two edges 3 fitting side portions of two ends of a metal clamp, and a gap 4 is formed between the two edges 3 for containing the two ends of the metal clamp. The ends of the metal clamp can be inserted into the gap 4 along an axial direction of the pipe, and a strip opening of the gap 4 is oriented to one side of the plier handle 2. This design ensures that the clamp handle 2 forms a shear torsion handle with the pipe when the ends are inserted into the gap 4.

According to the embodiment 1, the plier head 1 is a clamp locking plier head for clamping the two ends of the metal clamp. Specifically, the plier head 1 and the plier handle 2 together work as a conventional plier tool, i.e., clamp locking pliers for locking the metal clamp. The plier head 1 comprises two pins 5 symmetrically set on left and right, and a positioning shaft 6 located in a middle of the plier head 1; two clamping portions 7 are formed at a front portion of the plier head 1, which are configured to clamp the side portions of the two ends of the metal clamp.

Preferably, two end plates 8 are mounted on the side portions of the plier head 1 by the pins 5, and extension parts are from on a same side of the two end plates 8, which are on one side of the plier head; the edges are formed on internal sides of tip ends of the extension parts. Grooves 8-1 are arranged on internal surfaces of the extension parts, and the grooves 8-1 of the two extension parts together form a slot at interior of the gap 4. A limiting tab 8-2 is formed at a bottom portion of at least one of the grooves 8-1, which forms a limiting structure located in a bottom portion of the slot, so as to limit an insertion depth of the ends of the metal clamp which are inserted into the slot from a top end thereof.

The cutting head of the pliers is intended to be used as follows.

Figure 4:
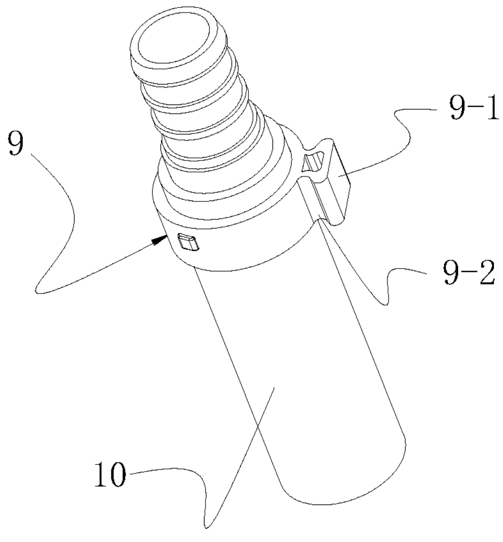
FIG. 4 is a perspective view illustrating a structure of a mounted metal clamp.
Figure 5:
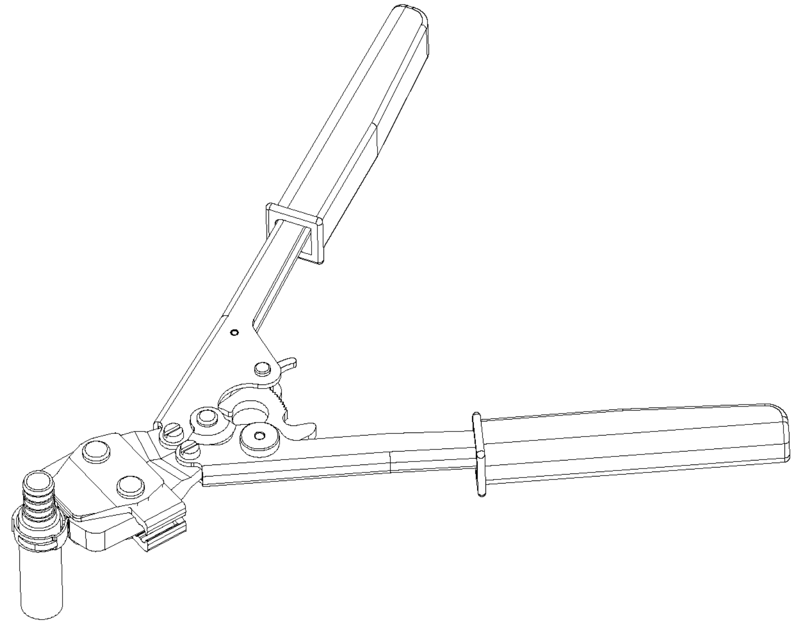
FIG. 5 is a sketch view illustrating mounting the metal clamp with the pliers of the embodiment 1.
Figure 6:
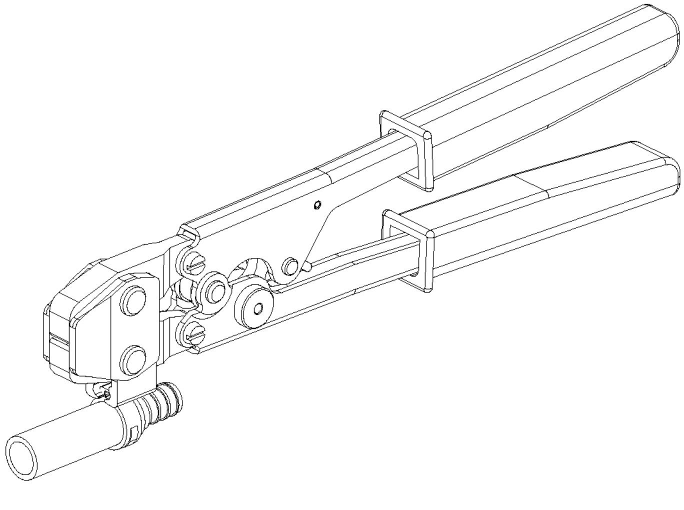
FIG. 6 is a sketch view illustrating removing the metal clamp with the pliers of the embodiment 1.

Referring to FIG. 4, axial grooves 9-2 are formed by clamping on both axial sides of the end 9-1 of the metal clamp 9, and an axial end is formed on an external side of the axial groove 9-2. FIG. 5 is a sketch view illustrating mounting the metal clamp with the pliers, and a removal process of the metal clamp 9 is shown in FIG. 6, wherein the axial end is inserted into the slot along an axial direction of the pipe 10 from the front end of the cutting head, and the gap portion snaps into the axial groove 9-2 of the end. After the end is stuck into the gap, the plier handle 2 and the pipe 10 work as a shear handle on which a twisting shear force is applied with both hands. Under the action of the twisting shear force, the edges cut off the end, and the ends of the metal clamp 9 can be easily cut off.

Embodiment 2

Figure 7:
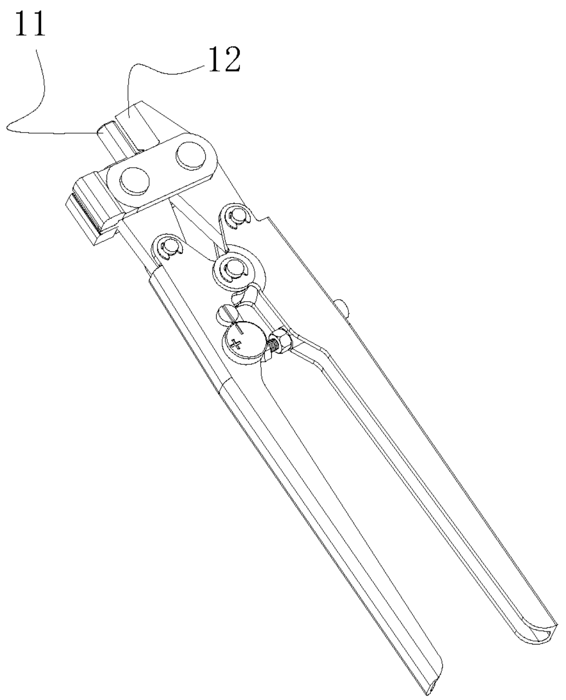
FIG. 7 is a perspective view of a pair of pliers according to an embodiment 2 of the present invention.
Figure 8:
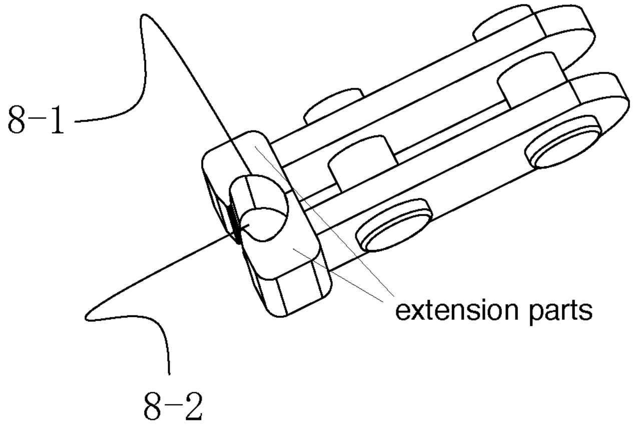
FIG. 8 is a perspective view of end plates of the pliers according to the embodiment 2 of the present invention.
Figure 9:
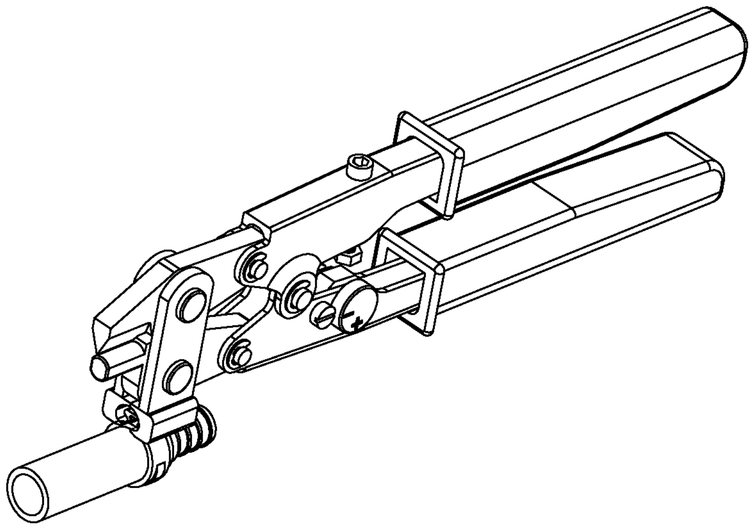
FIG. 9 is a sketch view illustrating removing the metal clamp with the pliers of the embodiment 2 of the present invention.

According to the embodiment 2, referring to FIGS. 7-9, the plier head 1 is configured to cut off copper clamping rings. Specifically, the plier head 1 and the plier handle 2 together work as a conventional plier tool, i.e., cutting pliers for cutting the copper clamping rings. The plier head 1 comprises two pins 5 symmetrically set on left and right, and a positioning shaft 6 located in a middle of the plier head 1; a clamping head 11 and an external edge 12 are formed at a front portion of the plier head 1, wherein the clamping head 11 is configured to extend into a pipe from an end thereof, while the external edge part is configured to cut the copper clamping rings from outside the pipe. According to the embodiment 2, the structure and installation of the cutting head are the same as those of the embodiment 1, i.e., they are formed by the end plates provided at the two sides of the plier head 1, and the end plates are also fixed by the pins, which will not be further described herein.

The above embodiments are only preferred ones of the present invention, and are not intended to be limiting. Any modifications, equivalent substitutions and improvements made within the spirit and principles of the present invention shall be included in the protection scope thereof.

What is claimed is:

1. Multifunctional pliers, comprising: a plier head and a plier handle, wherein a cutting head is provided at two side portions of the plier head, which has two edges and each edge of the two edges fits a side portion of each respective end of two ends of a metal clamp; and a gap is formed between the two edges for containing the two ends of the metal clamp;

wherein a strip opening of the gap is oriented in a direction in which a top portion of the plier handle faces;

wherein the plier head is a ring locking plier head for clamping the two ends of the metal clamp, which comprises two pins symmetrically set on left and right of the side portions of the plier head, and a positioning shaft located in a middle of the plier head; two clamping portions are formed at a front portion of the plier head, which are configured to clamp the side portions of the two ends of the metal clamp;

wherein two end plates are mounted on the side portions of the plier head by the pins, and extension parts are formed on the two end plates, which are on one side of the plier head; the edges are formed on internal sides of tip ends of the extension parts.

2. Multifunctional pliers, comprising: a plier head and a plier handle, wherein a cutting head is provided at two side portions of the plier head, which has two edges and each edge of the two edges fits a side portion of each respective end of two ends of a metal clamp; and a gap is formed between the two edges for containing the two ends of the metal clamp;

wherein a strip opening of the gap is oriented in a direction in which a top portion of the plier handle faces;

wherein the plier head is configured to cut the metal clamp, which comprises two pins symmetrically set on left and right of the side portions of the plier head, and a positioning shaft located in a middle of the plier head; a clamping head and an external edge are formed at a front portion of the plier head, wherein the clamping head is configured to extend into a pipe from an end thereof, while the external edge part is configured to cut the metal clamp from outside the pipe;

wherein two end plates are mounted on the side portions of the plier head by the pins, and extension parts are formed on the two end plates, which are on one side of the plier head; the edges are formed on internal sides of tip ends of the extension parts.

3. The multifunctional pliers, as recited in claim 1, wherein grooves are arranged on internal surfaces of the extension parts, and the grooves of the two extension parts together form a slot at interior of the gap.

4. The multifunctional pliers, as recited in claim 2, wherein grooves are arranged on internal surfaces of the extension parts, and the grooves of the two extension parts together form a slot at interior of the gap.

5. The multifunctional pliers, as recited in claim 3, wherein a limiting tab is formed at a bottom portion of at least one of the grooves, which forms a limiting structure located in a bottom portion of the slot.

6. The multifunctional pliers, as recited in claim 4, wherein a limiting tab is formed at a bottom portion of at least one of the grooves, which forms a limiting structure located in a bottom portion of the slot.

* * * * *